(12) United States Patent
Rutherford et al.

(10) Patent No.: US 11,748,741 B2
(45) Date of Patent: Sep. 5, 2023

(54) PAYMENT CARD STORING TOKENIZED INFORMATION

(71) Applicant: MasterCard International Incorporated, Purchase, NY (US)

(72) Inventors: Bruce John Rutherford, Stamford, CT (US); Mark Lulic, Northvale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 173 days.

(21) Appl. No.: 16/939,514

(22) Filed: Jul. 27, 2020

(65) Prior Publication Data

US 2020/0356982 A1    Nov. 12, 2020

Related U.S. Application Data

(63) Continuation of application No. 15/069,292, filed on Mar. 14, 2016, now abandoned.

(Continued)

(51) Int. Cl.
*G06Q 20/34* (2012.01)
*G06Q 20/38* (2012.01)
(Continued)

(52) U.S. Cl.
CPC ....... *G06Q 20/341* (2013.01); *G06F 21/6245* (2013.01); *G06F 21/6254* (2013.01); *G06Q 20/385* (2013.01); *G07F 7/0866* (2013.01); *H04L 9/3228* (2013.01); *G06Q 2220/00* (2013.01)

(58) Field of Classification Search
CPC ............... G06Q 20/341; G06Q 20/385; G06Q 2220/00; G06F 21/6245; G06F 21/6254; G07F 7/0866; H04L 9/3228
See application file for complete search history.

(56) References Cited

U.S. PATENT DOCUMENTS

2007/0262138 A1  11/2007  Somers et al.
2011/0251955 A1  10/2011  Lam
(Continued)

FOREIGN PATENT DOCUMENTS

WO    2012163970 A1    12/2012

OTHER PUBLICATIONS

European Search Report dated Sep. 11, 2020 which was issued in connection with a counter part application EP patent No. 16762698.5.

*Primary Examiner* — Jacob C. Coppola
(74) *Attorney, Agent, or Firm* — Buckley, Maschoff & Talwalkar LLC (57) ABSTRACT

Provided are a payment card, system and method for storing and reading tokenized payment account information from a payment card. In an exemplary embodiment, a payment card may include a substrate forming a body of the payment card, and an electronic chip attached to or included in the substrate. According to various exemplary embodiments, the electronic chip may include a storage storing tokenized payment account information corresponding to a payment account linked to the payment card. The electronic chip may be read by a payment terminal and may provide the tokenized payment information to the payment terminal during reading.

18 Claims, 6 Drawing Sheets

Related U.S. Application Data

(60) Provisional application No. 62/132,300, filed on Mar. 12, 2015.

(51) Int. Cl.
*G07F 7/08* (2006.01)
*G06F 21/62* (2013.01)
*H04L 9/32* (2006.01)

(56) References Cited

U.S. PATENT DOCUMENTS

| | | |
|---|---|---|
| 2012/0203700 A1 | 8/2012 | Ornce et al. |
| 2013/0297504 A1 | 11/2013 | Nwokolo et al. |
| 2014/0114857 A1 | 4/2014 | Griggs et al. |
| 2015/0046338 A1 | 2/2015 | Laxminarayanan et al. |
| 2015/0319158 A1* | 11/2015 | Kumnick ........... G06Q 20/4016 726/9 |

\* cited by examiner

PAYMENT CARD STORING TOKENIZED INFORMATION

CROSS-REFERENCE TO RELATED APPLICATION

The present application is a continuation of U.S. patent application Ser. No. 15/069,292, filed on Mar. 14, 2016, which claims the benefit of U.S. Provisional Patent Application No. 62/132,300, filed on Mar. 12, 2015, the entire contents of both of which are hereby incorporated by reference for all purposes.

FIELD

Exemplary embodiments described herein relate generally to payment cards used for the payment of goods and/or services and, more particularly, to securing data stored on a payment card through the use of tokens.

BACKGROUND

Various payment systems utilize integrated circuit (IC) cards (e.g., smart cards, EMV cards, chip cards, and the like) which may be interfaced with a payment terminal via electrical points of contact on the card. During a purchase transaction, the payment card account number and other information may be uploaded from the EMV payment card to the payment terminal via the integrated circuit contacts and a contact card reader associated with the payment terminal. For example, the consumer or EMV payment card user may be directed to physically "tap" or insert the EMV payment card onto a specific contact surface or into a specific slot associated with the card reader so that data may be transferred. Authorization and clearing may then proceed in substantially the same manner as for a transaction initiated with a conventional credit card or debit card having a magnetic stripe (putting aside additional security measures that may be implemented by using the processing capabilities of the IC payment card).

Payment tokens are surrogate values that may be used to replace a primary account number ("PAN") of a payment card in the payment systems. These tokens provide increased protection against fraudulent use such as counterfeiting, account misuse, and other forms of fraud. In March 2014, EMVCo published the "EMV® Payment Tokenisation Specification—Technical Framework v1.0" which provides a framework for implementing payment services in which the payment tokens are used to initiate payment. The framework generally describes the payment tokenization landscape, the types of entities whose participation is key to supporting payment tokenization, sufficient detail to implement multiple use cases, and the benefits of adopting a unified approach.

However, despite various payment use cases involving the transfer of payment tokens instead of PANs, an EMV payment card still has a primary account number linked with the card that is stored within the electronic chip and within the magnetic stripe. As a result, when the electronic chip or the magnetic stripe from the EMV card is read by an EMV reader either by contact or contactless, the PAN and other sensitive cardholder data is read and is transferred from the EMV card to the reader which is then transferred to the payment network during processing of the payment. That is, sensitive cardholder information stored on the electronic chip is put at risk during a payment transaction. Therefore, it would be desirable to provide systems and methods which allow payment cards (including contact and contactless chip payment cards and mobile devices) to be personalized in a way which prevents PANs and other sensitive cardholder data from being exposed during a transaction.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings, in which.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

In general, and for the purpose of introducing concepts of exemplary embodiments, EMV payment card (IC payment card or electronic chip card) personalization and transaction techniques are described herein which allow EMV payment cards to be personalized such that the EMV cards may be created with (i) payment tokens (e.g., stored in a memory of a contact or contactless chip) and (ii) a primary account number (PAN) may be printed and/or embossed on a face and/or stored in a magnetic stripe of the payment card. Further, exemplary embodiments allow domain and other transaction restrictions to be used during authorization processing to provide further increased protection against counterfeiting, account misuse, and other forms of fraud. In some embodiments, chip cards with payment tokens may also operate in an offline mode where the cards are personalized to support offline transactions at terminals that also support such transactions. In such embodiments, domain restrictions may be validated using data provided in a clearing message, instead of an authorization message. As used herein, the term "chip card" or "payment card" is generally used to refer to a contact or contactless payment card (e.g., such as a card configured to operate as an EMV payment card or IC payment card).

Tokens and several tokenization use cases are proposed by the EMVCo Payment Tokenisation Specification, including Mobile NFC at Point of Sale, Mobile Digital Wallet E-commerce, Card-on-File E-Commerce, and Scan at Point of Sale. Various exemplary embodiments herein personalize the contact and/or contactless chip on a credit or debit card with a payment token and also allow the PAN to remain on the physical card in the embossing/printing and/or on the magnetic stripe. Today's business climate includes large scale data breaches where credit and debit card account data is compromised and used by criminals to conduct both counterfeit and card not present fraud. The counter measure to credit card fraud that is widely supported globally today is the introduction of EMV technology to cards and devices as well as merchant terminals. Proper deployment of EMV may prevent a card from being cloned or counterfeited based upon a data compromise of transactions that were initiated by an EMV enabled card at an EMV terminal resulting in a full grade EMV transaction.

However, transactions initiated by an EMV payment card at an EMV terminal (e.g., electronic chip cards that are read by an electronic terminal) do not include encrypted PAN and expiration dates. Rather, an actual PAN number and an actual expiration date are read by the EMV terminal from the EMV payment card. Consequently, it is possible that compromised EMV transactions can result in the PAN and expiration date being exposed to criminals. The stolen PAN and expiration date data may be used by criminals to initiate card not present transactions where only the PAN and the expiration date are required such as in electronic commerce, card on file, mail order/telephone order (MOTO) channels, and the like. This is sometimes referred to as "cross channel fraud."

According to various exemplary embodiments, EMV cards are personalized with one or more payment tokens instead of a PAN and/or an expiration date and provide an opportunity to reduce the impact of cross channel fraud. EMV transactions initiated by EMV cards that contain a payment token instead of a PAN result in transactions in which only payment tokens, and not PANs, are read and are passed between the EMV card and the EMV terminal. In the event of a data breach, any compromised transactions that were initiated with payment tokens are not subject to cross channel fraud because the payment tokens are restricted in their usage by the domain restrictions that are contemplated as part of the EMV Payment Tokenization Specification. Attempts to utilize stolen or compromised tokens according to the exemplary embodiments for cross channel fraudulent activity will result in transactions being declined due to the domain restrictions described herein being applied within the issuer's designated token vault. As a result, there is business value in reduced fraud exposure and increased payments system integrity that provides for a reduction in reputational risks associated with the underlying impact of data breaches on the compromised entity, the payment brands, and the payments industry.

Figure 1:
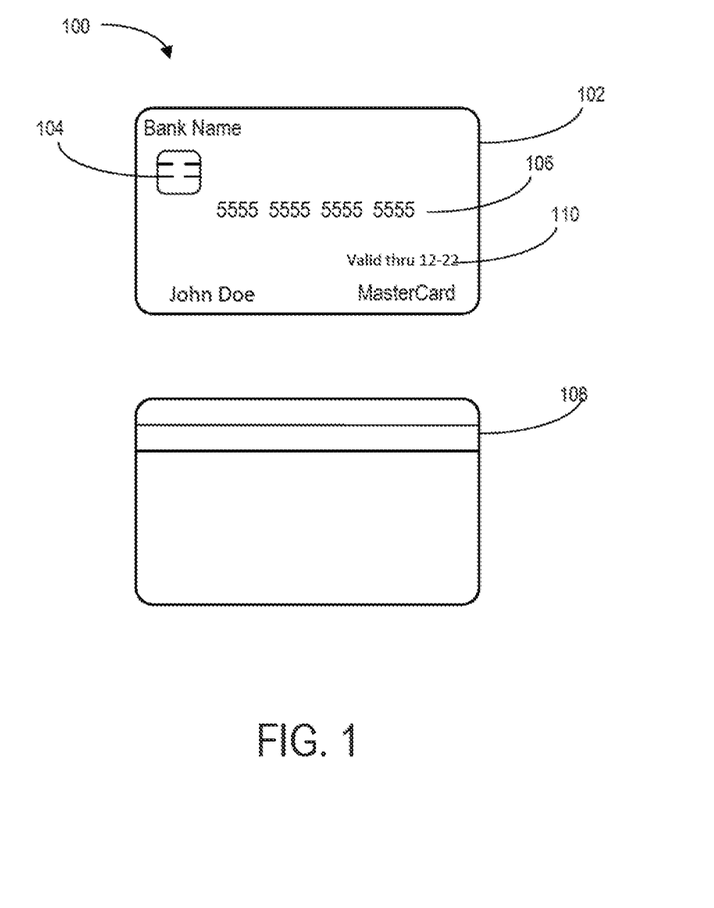
FIG. 1 is a diagram illustrating a front side and a back side of a payment card in accordance with an exemplary embodiment.

FIG. 1 illustrates a front side and a back side of a chip-based payment card 100 (i.e., card 100) in accordance with an exemplary embodiment. Referring to FIG. 1, the card 100 includes a substrate 102 that forms the physical structure or housing for the card 100. The substrate 102 may have dimensions of a normal credit card size. The substrate 102 may include or may be formed of a plastic material, for example, polyvinyl chloride, polyethylene terephthalate based polyester, acrylonitrile butadiene styrene, polycarbonate, and the like. Various lettering, characters, logos, and the like, associated with a card issuing bank may be written or printed on an outside surface of the substrate 102. In some examples, a primary account number (PAN) 106 may be embossed and/or printed on the surface of the substrate 102. Also, an expiration date 110 may be embossed and/or printed on the outer surface of the substrate 102.

In this example, the card 100 further includes an electronic chip 104 that is attached to or otherwise included within the card 100. For example, the electronic chip 104 may be embedded within the substrate 102 of the card 100 during a manufacturing process of the card 100. According to various exemplary embodiments, tokenized payment account information of a payment account linked to the card 100 may be stored within a storage or memory of the electronic chip 104. For example, the tokenized payment information may include a tokenized PAN, a tokenized expiration date, and the like. The electronic chip 104 may be capable of transferring the tokenized payment account information to a payment terminal or reader such as the terminal shown in FIG. 4. For example, the electronic chip 104 may include one or more electrical contacts that are configured to be contacted by a reader to form a circuit connection enabling data stored on the electronic chip 104 to be transferred to the reader. As another example, the electronic chip 104 may communicate with a payment terminal or a reader wirelessly and without contact, for example, using a radio wave transmission such as a contactless 13.56 MHz communication, a magnetic field transmission, and the like. In some cases, the electronic chip 104 may include a storage (not shown) and a processor (not shown) enabling the chip 104 to electronically communicate either through contact or contactless with a payment terminal. Prior to being transferred by contact or contactless connection, the tokenized payment information may be encrypted.

FIG. 1 further illustrates an example of a back side surface of the substrate 102 of the card 100. In this example, the card 100 further includes a magnetic stripe 108 adhered to or otherwise attached to the surface of the substrate 102. According to various exemplary embodiments, tokenized payment information may be encoded within the magnetic stripe 108. Accordingly, when the magnetic stripe 108 is read by or swiped past a magnetic reading head, tokenized payment information may be transferred from the magnetic strip 108 (or the card) to the reader, instead of actual payment account information. For example, the tokenized payment account information may include one or more of a tokenized PAN, a tokenized expiration date, and the like.

Figure 2:
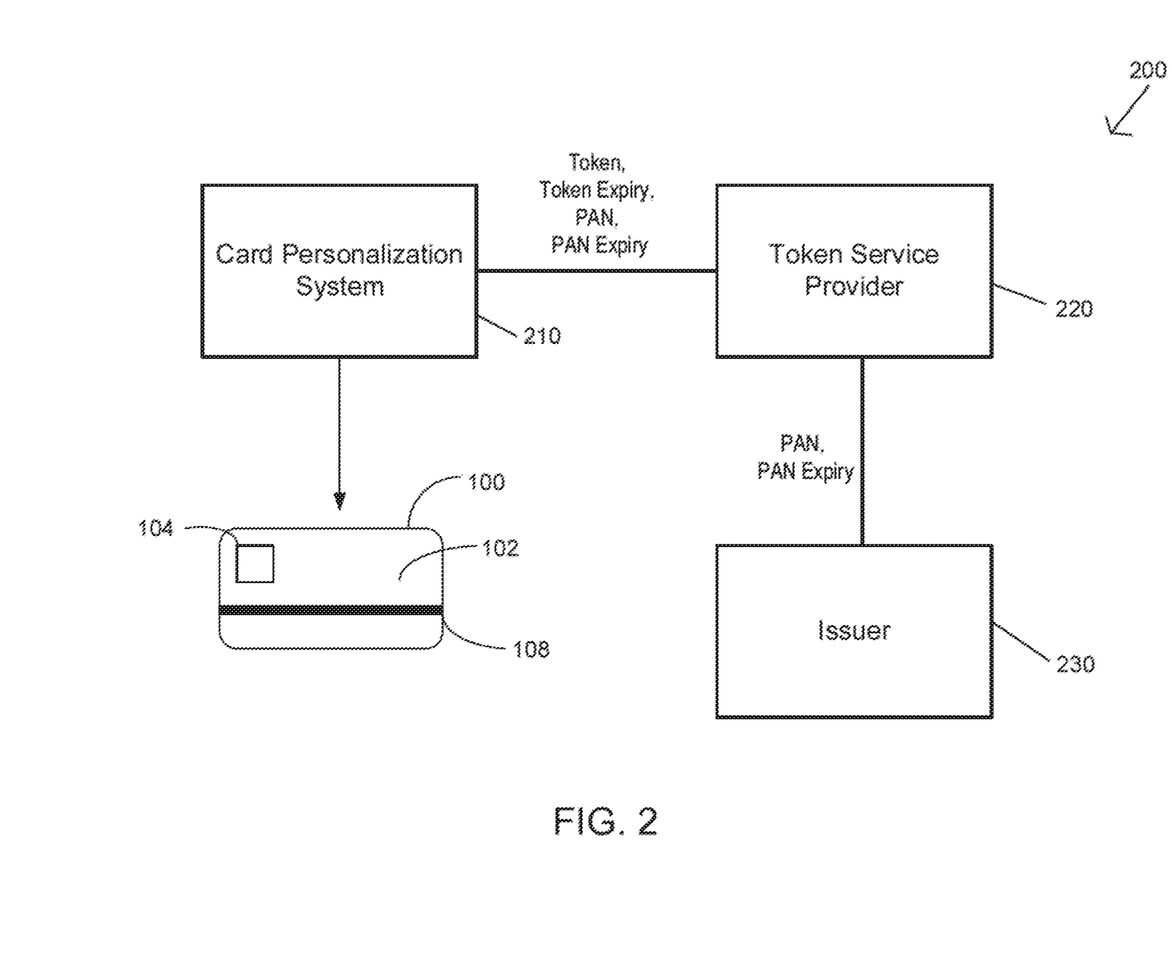
FIG. 2 is a diagram illustrating a payment card personalization system in accordance with an exemplary embodiment.

FIG. 2 illustrates a payment card personalization system 200 in accordance with an exemplary embodiment. As shown, a number of components, entities or systems may be involved in a personalization process pursuant to the exemplary embodiments. The system 200 may include one or more financial account issuers 230 (such as banks or other financial institutions), one or more token service providers 220, one or more card personalization systems 210, and the like. Processing of the system 200 may result in the personalization and issuance of multiple different payment devices 100 (e.g., cards) having both payment tokens stored in an electronic chip 104 and/or a magnetic stripe 108 thereof, and PANs (e.g., embossed or printed on a substrate 102 of the payment device 100 and/or in some examples stored in the magnetic stripe 110 thereof.

Pursuant to some embodiments, the issuer 230 may generate data for personalization, for example, by creating a file or feed including PAN and PAN expiry data. In some embodiments, the issuer data is provided to a token service provider 220 for processing to generate or assign one or more payment tokens to each payment account to be tokenized. For example, the token service provider 220 may then communicate data to the card personalization system 210 to perform the personalization of a card. The data may be transmitted via an application programming interface (API) or in a batch or other transmission mode, and may include the PAN and PAN expiry originally assigned by the issuer 230 as well as the corresponding payment token and payment token expiry date generated by the token service provider 220. The card personalization system 210 may then be operated to personalize data on the payment device 100 such that tokenized payment information such as a payment token for a PAN and a payment token for an expiry are stored in an electronic chip 104 (or memory) of the payment device 100 and the PAN and PAN expiry are printed or embossed on a face of the substrate 102 of the payment device 100. In some examples, the tokenized payment information may also be encoded in the magnetic stripe 108 of the payment device 100. After the payment device 100 has been personalized, it may be provided to a cardholder of the account for use.

In some embodiments, the token service provider 220 may interface with card personalization systems 102 (or bureaus) and/or with issuers 230 directly, for example, via an API, and the like, if the issuer 230 is directly responsible for personalization and/or card production. Pursuant to some embodiments, the API is implemented across a secure data exchange framework and may support at least the following data elements:

| Field | Length | Format |
|---|---|---|
| Primary Account Number | Variable (13 to 19 digits) | Numeric |
| Expiration Date | 4 | Numeric |
| Payment Token | Variable (13 to 19 digits) | Numeric |
| Payment Token Expiration Date | 4 | Numeric |
| Payment Account Reference (PAR) | 29 | Alphanumeric |
| Token Requester ID | 11 | Numeric |
| Last 4 digits of PAN | 4 | Numeric |

The interface established between the token service provider 220 and the card personalization system 210 may be leveraged for not only initial card issuance but also for supporting lifecycle events. Issuer driven card replacement decisions associated with business events such as expired cards, cardholder reports of lost/stolen/never received or damaged or inoperable cards, or replacement due to exposure to data breaches may be accounted for in regards to the business integration between the issuer 230, the card personalization system 210, and the token service provider 220. In some examples, card personalization systems 210, or issuers 230 that personalize their own cards, may integrate the API data feed into their current business operations so that the data can be integrated into the data preparation.

According to various exemplary embodiments, a new API may be established between the token service provider 220 and one or more card personalization systems 210. In some embodiments, an existing lifecycle management API or interface between the token service provider 220 and the issuer 230 may remain in place to support the ongoing synchronization between the issuer 230 and the token service provider 220 regarding lifecycle events that impact the ongoing payment token to PAN mapping. An existing API may be updated with new indicators to signal an issuer's intention to trigger a new card personalization/production or replacement card personalization/production based on various issuer-driven or cardholder requested card production requests.

Tokenization of chip cards also creates an opportunity to embed certain tokenization data within the personalized EMV chip (e.g., electronic chip 104) and to identify such data through the creation of new tags as defined and assigned by EMVCo. EMV uses tags to uniquely identify the data object from the list of various tags defined in the EMV specifications. Tags are typically encoded over 1 or 2 bytes. Tags may be assigned to support the ability to uniquely identify existing data elements used in tokenization including a token requestor ID which has not yet been accounted for in regards to EMV tags. Examples of possible new EMV tags are illustrated in Table 1. For example, the payment account reference (PAR) tag may be a non-financial reference assigned to each unique PAN and used to link a payment account represented by that PAN to affiliated payment tokens. The fixed length 29 character data format may include a four (4) character BIN controller identifier assigned by EMVCo to registered BIN controllers, followed by a 25 character value that is unique across PANs associated and defined by the registered BIN controller. As another example, the token requestor ID may be a value that uniquely identifies the pairing of the token requestor with the token domain. Thus, if a given token requestor desires tokens for multiple domains, it may have multiple token requestor IDs, one for each domain. The token requestor ID may be an 11-digit numeric value assigned by a token service provider and may be unique within the token vault. As an example, numerical positions 1-3 of the token requestor ID may be token service provider code unique to each token service provider and numerical positions 4-11 of the token requestor ID may be assigned by the token service provider for each requesting entity and token domain.

According to various exemplary embodiments, domain or other controls may be applied by the token service provider 220 (or other entity) during a payment authorization transaction to improve fraud control. For example, cross channel fraud may be controlled by ensuring that the token vault operated by the token service provider 220 applies domain restrictions for transactions initiated with payment tokens from chip cards. For example, when the token vault receives a transaction authorization request from the payment network, the chip cryptogram (ARQC) may be validated by the token vault, and other fields of the authorization message may be interrogated to ensure the transaction satisfies the expectations of the valid domain assigned to the token card ranges. For example, an electronic chip card payment token that is authorized for a transaction initiated from a POS entry mode associated with a transaction in which the payment account information is read from a magnetic stripe may be declined by a domain restriction control because the payment token is not valid for a magnetic stripe. As another example, transactions initiated with the payment token that showed POS entry modes associated with electronic commerce, Mail Order/Telephone Order, other card not present channels, and the like, may also fail a domain restriction control because the POS entry mode is not contact or contactless chip read. The lack of a valid chip cryptogram on these transactions would also be domain restriction controls that would fail and trigger a transaction decline due to failing domain restriction control logic.

The first four to six digits of a PAN (often six digits) typically identify the issuing financial institution for the PAN or otherwise are key for routing transactions in a payment system. This portion of the PAN is known as the BIN (Bank Identification Number) or IIN (Issuer Identification Number). If tokens are to be used for routing of transactions, as proposed in the Tokenization Standard, the leading digits of the tokens must also be constituted by a BIN. According to a proposal in the Tokenization Standard, tokens are not to have the same BINs as PANs. In other words, the Tokenization Standard proposes that certain BIN ranges be assigned exclusively for generating tokens, with such token-dedicated BINs not to be shared with PANs.

Accordingly, when a chip card is read by an EMV reader, the chip card may provide tokenized payment account information to the EMV reader (via contact or contactless reading). The tokenized payment information may include a tokenized PAN, a tokenized expiration date, and the like. In response to receiving the tokenized payment information, the EMV reader may generate an authorization request message based on the received tokenized payment information and transmit the authorization request message to a payment network, and the like, for payment processing. When generating the authorization request message, the EMV reader may insert the tokenized PAN into the authorization request message and also indicate within the message that the tokenized PAN was read from a chip-based payment card (i.e., using an entry mode field) to indicate that the card was read by contact or contactless with the chip, and the like. When a token aware device such as a token service provider receives the authorization request message, the token service provider may determine that the value of the PAN is a tokenized value from a chip card instead of an actual value based on, for example, the BIN of the tokenized PAN. Accordingly, the token service provider may verify that the tokenized PAN has been received through a contact or contactless reading from a chip card by checking the entry mode field of the authorization request message.

In a case in which the tokenized PAN according to various exemplary embodiments has been stolen, the fraudster may attempt to use the tokenized PAN as if it were an actual PAN, for example, in a card not present (CNP) e-commerce transaction with a merchant. In this case, the fraudster may input the tokenized PAN into a card number field of a merchant website. In response to receiving the tokenized PAN, a payment terminal of the merchant website may generate an authorization request message including the tokenized PAN in an account field and transmit the authorization request message to the payment network for processing. In this case, when the token service provider receives the tokenized PAN in the account field, the token service provider will detect that the PAN is a tokenized PAN, for example, based on the first 4 to 6 digits of the PAN. Accordingly, the token service provider will attempt to verify that the tokenized PAN has been received from a card present transaction based on an entry mode field of the authorization request message. But in this case, because the tokenized PAN was received from an e-commerce transaction, the entry mode field will indicate that the card was not present. As a result, the token service provider may determine that the tokenized PAN is being used improperly, and can decline the transaction.

Figure 3:
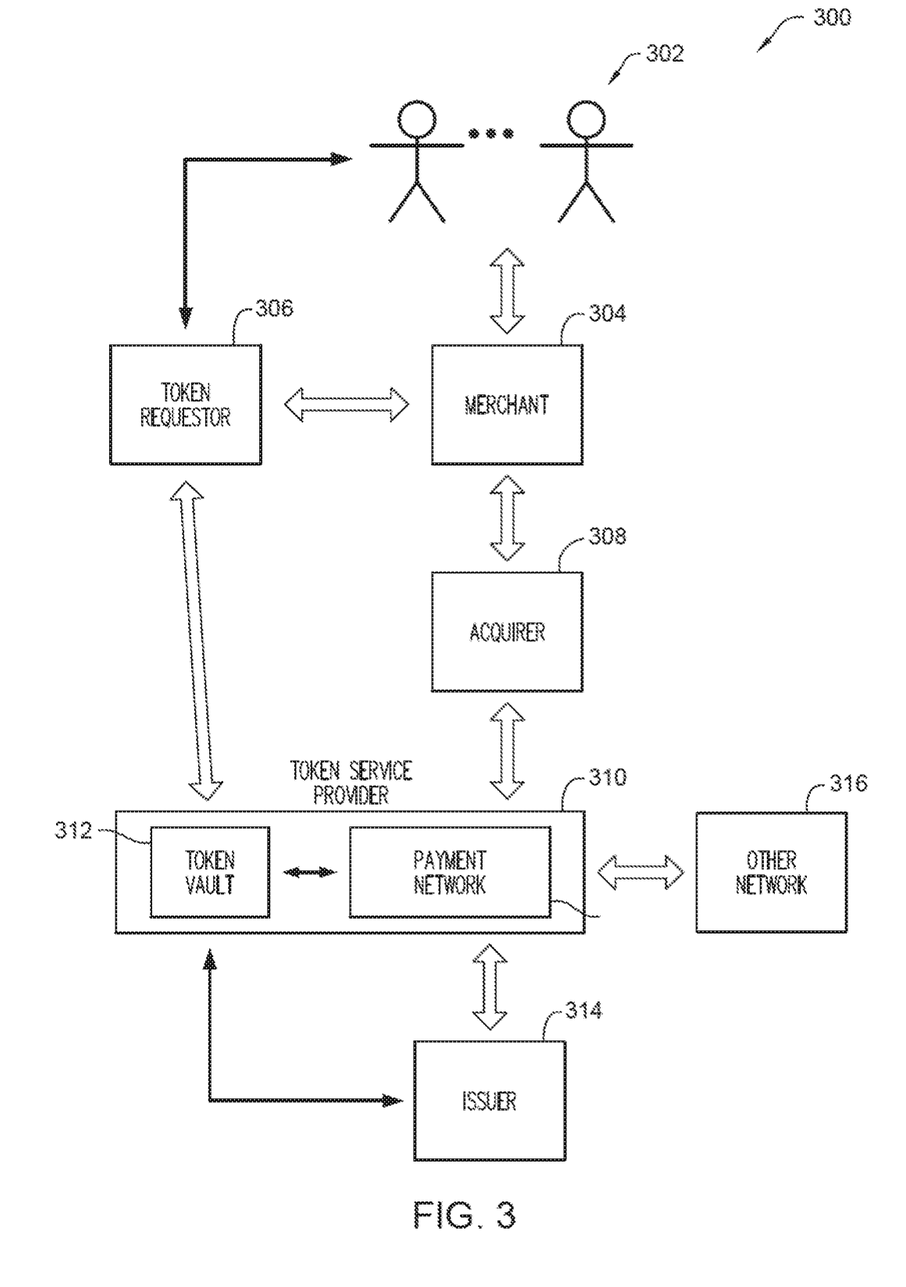
FIG. 3 is a diagram illustrating an overview of a payment system in accordance with an exemplary embodiment.

FIG. 3 illustrates a payment system 300 in which teachings of the present exemplary embodiments may be applied. (FIG. 3 is adapted from the EMV Tokenization Standard). Referring to FIG. 3, individual users/cardholders are indicated by reference numeral 302 and a token requestor is indicated by 306. In this example, the token requestor 306 may request or manufacture a payment card such as the payment card 100 in FIGS. 1 and 2, and provide the payment card to the user 302. According to various exemplary embodiments, the payment card may include an electronic chip that has tokenized payment account information stored therein in place of actual payment account information. Cardholders 302 may present electronic chip payment devices to merchant 304 to consummate a purchase transaction. In some cases the merchant 304 may also be a token requestor 306 (e.g., for implementing a tokenized card-on-file arrangement for e-commerce transactions with a cardholder 302). The merchant 304 may receive a token value from a cardholder's payment device and issue an authorization request to initiate processing of a payment transaction in the payment system 300. For example, the merchant 304 may issue the authorization request to acquirer 308 which may be a financial institution that provides banking services to the merchant 304, and that receives and routes authorization requests originated from the merchant 304.

According to various exemplary embodiments, merchant 304 may include a reader (an example of which is described with reference to FIG. 4) which may read the tokenized payment account information from an electronic chip of a payment card or other payment device of the cardholder 302. Here, the merchant 304 may receive the tokenized payment account information from the electronic chip and be unaware that the payment account information has been tokenized. For example, the tokenized payment account information may include a tokenized PAN and a tokenized expiry having a valid format such that they are not distinguishable from an actual PAN and an actual expiration date.

FIG. 3 also includes a block 310 that represents a token service provider. The token service provider 310 may also be the operator of a payment network such as that operated by MasterCard International Incorporated, the assignee hereof. The token service provider 310 may be authorized in the payment system 300 to issue tokens to token requestors (one such token requestor represented by block 306 in FIG. 3). In issuing tokens, the token service provider 310 may perform such functions as operating and maintaining a token vault 312, generating and issuing tokens (in accordance, e.g., with aspects of the present disclosure), assuring security and proper controls, token provisioning (e.g., personalizing payment cards, etc. with token values), registering token requestors, and the like. In addition to representing the token service provider, block 310 should also be understood to represent one or more computer systems operated by the token service provider.

Block 314 in FIG. 3 represents an issuer of payment card accounts held by the cardholders 302. In some embodiments, some or all of the functions of the token service provider 310 may be taken on or performed by the issuer 314. Referring again to the token requestor 306, this role may be taken on by entities such as card-on-file merchants (as noted above); acquirers, acquirer processors, and payment gateways (acting for merchants); payment enablers such as OEMs (original equipment manufacturers); digital wallet service providers or issuers 314. Token requestors may be required to register with the token service provider 310. Furthermore, the token service provider 310 may interact with another payment network 316. It will be readily appreciated that a practical embodiment of the payment system 300 may include numerous merchants, token requestors, acquirers and issuers, rather than one of each as depicted in FIG. 3.

In the example of FIG. 3, the cardholder 302 may make or authorize a payment for a transaction with the merchant 304 to purchase goods and/or services. According to various exemplary embodiments, the cardholder 302 may use an EMV payment card having embedded therein an electronic chip. The electronic chip may store tokenized payment account information. Accordingly, when the merchant 304 reads the EMV payment card the merchant may receive tokenized payment account information therefrom. The merchant 304 may then transmit the tokenized payment account information in an authorization request message (such as a message defined by ISO 8583). For example, the authorization request may be transmitted to the acquirer 308 and then to the token service provider 310, transmitted directly from the merchant 304 to the token service provider 310, and the like.

In response to receiving the authorization request message including the tokenized payment account information, the token service provider 310 may determine that the authorization request message includes tokenized payment account information. For example, the token service provider 310 may determine that a PAN included within the authorization request message is a tokenized PAN based on the BIN number of the tokenized PAN. The token service provider 310 may also determine from the tokenized PAN corresponds to an electronic chip card or EMV payment card. Accordingly, the token service provider 310 may determine whether the tokenized PAN was received from a contact or contactless read electronic chip card based on an entry mode field included in the authorization request message. If the token service provider 310 determines that the tokenized PAN has been read from an electronic chip card, the token service provider 310 may translate the tokenized PAN into an actual PAN and transmit the PAN directly to the issuer 314, or to the acquirer 308. Here, the token service provider 310 may store routing tables which can translate the tokenized payment account information into actual payment account information and determine where to transmit the tokenized payment information based on the routing tables. In some examples, the token service provider 310 may also store a translation of tokenized expiry, and the like, and thereby determine an actual expiry of the electronic chip card based on the routing tables.

Figure 4:
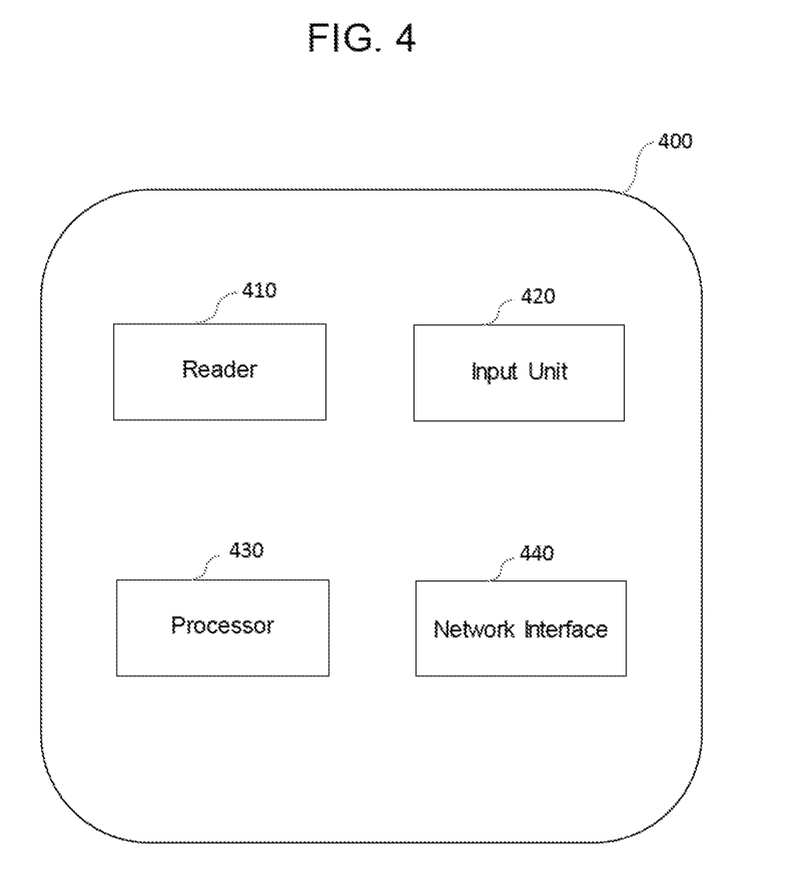
FIG. 4 is a diagram illustrating a payment terminal in accordance with an exemplary embodiment.

FIG. 4 illustrates a payment terminal 400 in accordance with an exemplary embodiment. In the example of FIG. 4, the payment terminal 400 includes a reader 410, an input unit 420, a processor 430, and a network interface 440. It should also be appreciated that the payment terminal 400 may include additional components not specifically shown, and/or one or more of the components shown may be omitted. As a non-limiting example, the payment terminal 400 may be a point of sale terminal (POS terminal) including an electronic device for processing card payments, for example, at retail locations, and the like. The payment terminal 400 may include a combination of software and hardware that allows retail locations to accept card payments without updating their cash registers to read cards directly.

The reader 410 may read tokenized payment card information from an electronic chip and/or from a magnetic stripe of a payment card such as an EMV payment card. For example, the reader 410 may read tokenized payment card information by contact with the electronic chip of the payment card. Here, the reader 410 may have electrical contacts capable of contacting electrical contacts of the electronic chip included in the payment card. Accordingly, when connect, the electronic chip may transfer the tokenized payment account information to the reader 410 through the electrical contacts. In some examples, the reader 410 may include a slot or other cavity capable of receiving at least a portion of the payment card and for holding the payment card therein. Also, the reader 410 may have electrical contacts included within the slot such that when the card is fully inserted into the slot, the electrical contacts of the reader 410 may be brought into contact with the electrical contacts of the electronic chip of the payment card. As another example, the reader 410 may wireless read tokenized payment account information from the electronic chip of the payment card. For example, the reader 410 may have a short range communication system that is able to receive tokenized payment information from the electronic chip of the payment card through wireless radio waves or a magnetic field.

The input unit 420 may receive additional information from a user to verify that the user is a cardholder corresponding to the payment account linked to the payment card. For example, the input unit 420 may receive a PIN and/or a signature verification from the user. In response to the tokenized payment account information being read from the electronic chip of the payment card, the processor 430 may generate an authorization request message such as an ISO 8583 message and the network interface 440 may transmit the authorization request message to an acquirer and/or other devices within a payment network or payment system such as shown in the example of FIG. 3. The network interface may also transmit the verification information provided by the user and received through the input unit 420 to the payment network. Furthermore, the processor 430 may control the overall operations of the payment terminal 400.

According to various aspects, the payment terminal 400 may receive tokenized payment account information stored on a payment card. For example, the payment card may include a substrate, and an electronic chip may be attached to or included in the substrate, and the tokenized payment account information may be stored on the electronic chip. The tokenized payment account information read from the payment card may include a tokenized PAN and a tokenized expiration date, corresponding to a payment account linked to the payment card. Accordingly, the payment terminal may reads tokenized payment account information off a customer's credit or debit card (via an electronic chip or magnetic stripe), checks whether sufficient funds are available in a customer's bank account, transfers the funds from the customer's account to the seller's account (or at least, accounts for the transfer with the credit card network), record the transaction, and print a receipt for the customer.

Figure 5:
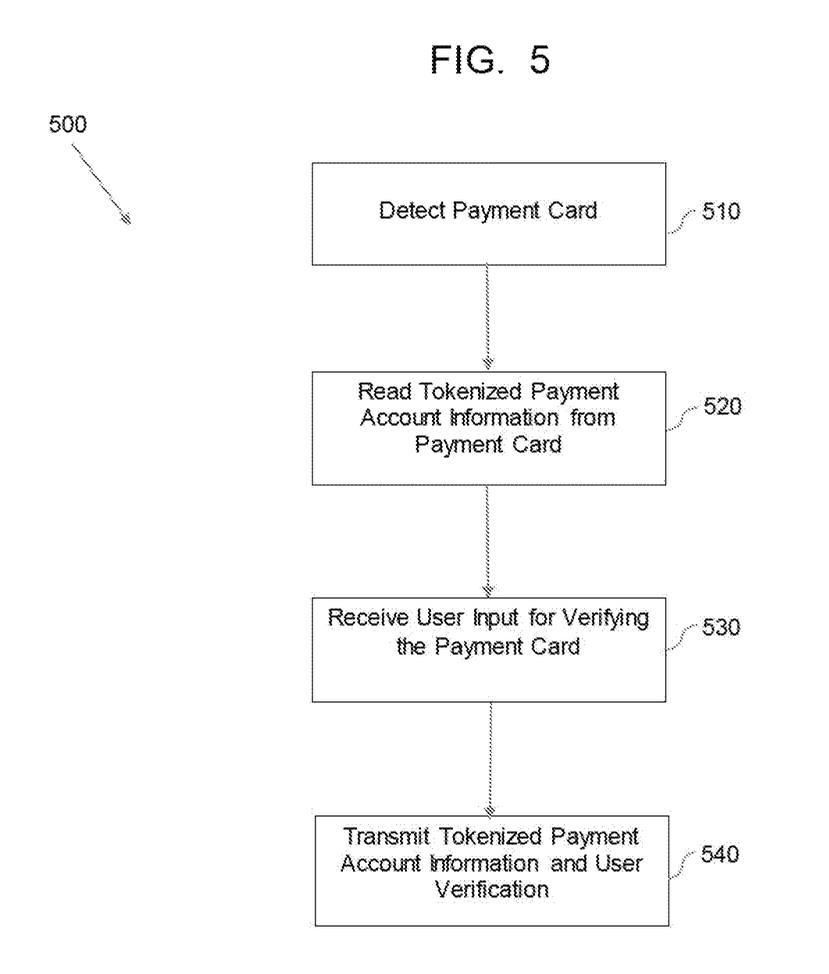
FIG. 5 is a diagram illustrating a payment processing method in accordance with an exemplary embodiment.

FIG. 5 illustrates a payment processing method 500 in accordance with an exemplary embodiment. Referring to FIG. 5, the method 500 for processing a payment may be performed by a payment terminal such as payment terminal 400 shown in FIG. 4. In this example, whether a payment card included an electronic chip is present is detected in 510. For example, the payment card may be inserted into a slot causing electrical contacts from the electronic chip of the payment card to contact electrical contacts of the payment terminal. As another example, the payment terminal may detect wireless transmissions from the electronic chip of the payment card when the payment card is brought within a predetermined proximity of the payment terminal. As a result of the reading, tokenized payment account information such as a tokenized PAN and a tokenized expiration date corresponding to a payment account linked to the payment card may be transferred from the payment card to the payment terminal.

In 520, tokenized payment account information is read from the payment card. In this example, the reading of tokenized payment account information may be contact or contactless and may be from an electronic chip of the payment card. Here, the payment card may include a substrate, the electronic chip may be attached to or included in the substrate, and the tokenized payment account information may be stored on the electronic chip. The method may further include receiving user input for verifying the payment card and the cardholder. For example, the user input may include a PIN number or a signature verification. Also, in 540 the method further includes transmitting the tokenized payment account information read from the electronic chip of the payment card to a payment network.

According to various exemplary embodiments, domain or other controls may be applied by a token service provider or other entity on the payment network during a payment authorization transaction in order to improve fraud control. For example, cross channel fraud may be prohibited by ensuring that a token vault operated by the token service provider applies domain restrictions for transactions that are initiated with payment tokens read from electronic chip payment cards.

Figure 6:
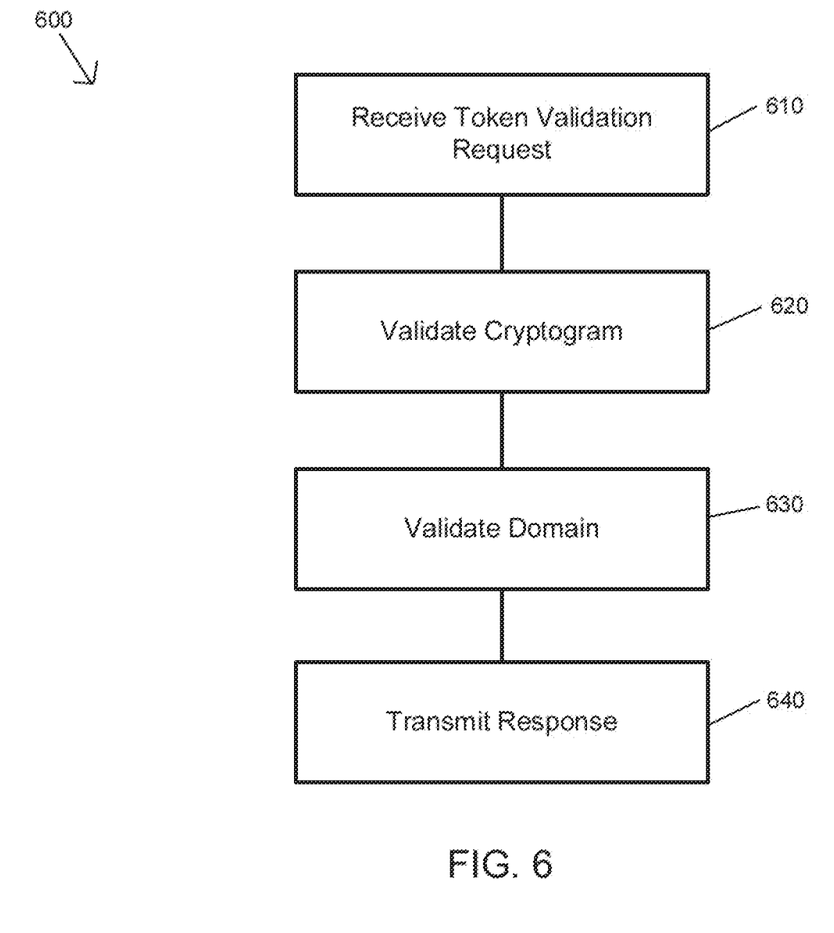
FIG. 6 is a diagram illustrating a method of enforcing domain restrictions within a payment system in accordance with an exemplary embodiment.

FIG. 6 illustrates a method 600 of enforcing domain restrictions within a payment system in accordance with an exemplary embodiment. That is, portions of a transaction enforcing domain restrictions are shown in FIG. 6, in which steps associated with processing by an entity such as a token service provider are shown. At 610 a token validation request may be received (e.g., during a payment transaction authorization process). The token validation request may include information about a transaction, including (depending on the type of transaction) a payment token and payment token expiry, or a PAN and a PAN expiry. A transaction "entry mode" indicator may also be received (identifying how the transaction was entered) such as a transaction entry mode indicator in an ISO 8583 message. For example, the entry mode may indicate whether the transaction was initiated at a magnetic stripe reader, at a chip card reader, at a PayPass terminal, in an online transaction, in a mail order or telephone transaction, or the like. The token validation request may also include a chip cryptogram (in the case of chip card transactions).

Processing continues at 620 where the cryptogram (if any) is validated. If the cryptogram cannot be validated, the transaction authorization fails, and a decline message response is returned. Processing continues at 630 where the domain is validated. For example, if the received information indicates that the transaction was initiated at a magnetic stripe reader, then the PAN and PAN expiry may be validated (and if a Payment Token is detected, the transaction is declined). The result is improved fraud protection and controls ensuring that a payment card pursuant to the present invention is used in appropriate domains. In 640 a result of the validation is transmitted to a payment network, a merchant, or the like.

According to various exemplary embodiments, described herein is a payment card such as an EMV payment card including an electronic chip and/or a magnetic stripe that have stored therein tokenized payment account information instead of actual payment account information. For example, a tokenized PAN and a tokenized expiry may be stored within an electronic chip of an EMV payment card. As another example, a tokenized PAN and a tokenized expiry may be encoded within the magnetic stripe of a payment card. Accordingly, tokens may be read from a payment card by a payment terminal during a transaction instead of sensitive payment card and payment account information.

As used herein and in the appended claims, the term "computer" should be understood to encompass a single computer or two or more computers in communication with each other. The term "processor" should be understood to encompass a single processor or two or more processors in communication with each other. The term "memory" should be understood to encompass a single memory or storage device or two or more memories or storage devices. Also, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable.

As used herein, the terms card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual. As used herein, the term "payment card system" or "payment system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

A number of terms are used herein. For example, the term "payment network." One well known example of a payment network is referred to as the "Banknet" system, and is operated by MasterCard International Incorporated, which is the assignee hereof. The term "issuer" may refer to a payment card issuer server computer (or network of computers) such as issuer 106. The payment card issuer server computer 106 may be operated by or on behalf of a financial institution ("FI") that issues payment card accounts to individual users. For example, the payment card issuer server computer 106 may perform such functions as (a) receiving and responding to requests for authorization of payment card account transactions to be charged to payment card accounts issued by the FI; and (b) tracking and storing transactions and maintaining account records.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A computing system comprising:
a network interface configured to receive, via a computing network, a token validation request from an integrated circuit card comprising a primary account number (PAN) on a face thereof, the token validation request comprising a tokenized PAN corresponding to the PAN on the face of the integrated circuit card, a transaction entry mode value comprising a value indicating that the tokenized PAN was read from a chip of the integrated circuit card via a chip reader, and a chip cryptogram of the chip of the integrated circuit card from which the tokenized PAN was read; and
a processor configured to token validation request based on the chip cryptogram of the chip from which the tokenized PAN was read and transaction entry mode value that indicates that the tokenized PAN was read from the chip of the integrated circuit card via the chip reader,
wherein the processor is further configured to control the network interface to transmit, via the computing network, an authorization response to a computing system associated with the token validation request in response to the validation, the authorization response authorizing the tokenized PAN for use in a payment transaction.

2. The computing system of claim 1, wherein the tokenized PAN includes domain restrictions that only permit the tokenized PAN to be used with chip card reading transactions, and the processor is configured to validate the tokenized PAN based on the domain restrictions that only permit the tokenized PAN to be used with chip card reading transactions.

3. The computing system of claim 1, wherein the transaction entry mode value comprises a Point-of-Sale (POS) entry mode value representing that the tokenized PAN was read by a contact chip reader.

4. The computing system of claim 1, wherein the processor is further configured to receive a PIN of a user for verifying that the user is a cardholder of the integrated circuit card, and determine to validate the tokenized PAN based on the PIN.

5. The computing system of claim 1, wherein the network interface is further configured to receive a second token validation request from a second integrated circuit card which comprises a second tokenized PAN and a second transaction entry mode value identifying a domain in which the second tokenized PAN was entered.

6. The computing system of claim 5, wherein the processor is further configured to decline the second token validation request when the second transaction entry mode value identifies that the domain in which the second tokenized PAN was entered is any of a magnetic stripe mode, an e-commerce mode, and a card not present mode.

7. A method comprising:
receiving, via a computing network, a token validation request from an integrated circuit card comprising a primary account number (PAN) on a face thereof, the token validation request comprising a tokenized PAN corresponding to the PAN on the face of the integrated circuit card, a transaction entry mode value comprising a value indicating that the tokenized PAN was read from a chip of the integrated circuit card via a chip reader, and a chip cryptogram of the chip of the integrated circuit card from which the tokenized PAN was read;
validating the token validation request based on the chip cryptogram of the chip from which the tokenized PAN was read and transaction entry mode value that indicates that the tokenized PAN was read from the chip of the integrated circuit card via the chip reader; and
transmitting, via the computing network, an authorization response to a computing system associated with the token validation request in response to the validation, the authorization response authorizing the tokenized PAN for use in a payment transaction.

8. The method of claim 7, wherein the tokenized PAN includes domain restrictions that only permit the tokenized PAN to be used with chip card reading transactions, and the validating comprises validating the tokenized PAN based on the domain restrictions that only permit the tokenized PAN to be used with chip card reading transactions.

9. The method of claim 7, wherein the transaction entry mode value comprises a Point-of-Sale (POS) entry mode value representing that the tokenized PAN was read by a contact chip reader.

10. The method of claim 7, further comprising receiving a PIN of a user for verifying that the user is a cardholder of the integrated circuit card, and the determining further comprises determining to validate the tokenized PAN based on the PIN.

11. The method of claim 7, further comprising receiving a second token validation request from a second integrated circuit card which comprises second tokenized PAN and a second transaction entry mode value identifying a domain in which the second tokenized PAN was entered.

12. The method of claim 11, further comprising determining to decline the second token validation request when the second transaction entry mode value identifies that the domain in which the second tokenized PAN was entered is any of a magnetic stripe mode, an e-commerce mode, and a card not present mode.

13. A non-transitory computer-readable medium comprising instructions which when executed by a processor cause a computer to perform a method comprising:

receiving, via a computing network, a token validation request from an integrated circuit card comprising a primary account number (PAN) on a face thereof, the token validation request comprising a tokenized PAN corresponding to the PAN on the face of the integrated circuit card, a transaction entry mode value comprising a value indicating that the tokenized PAN was read from a chip of the integrated circuit card via a chip reader, and a chip cryptogram of the chip of the integrated circuit card from which the tokenized PAN was read;

validating the token validation request based on the chip cryptogram of the chip from which the tokenized PAN was read and transaction entry mode value that indicates that the tokenized PAN was read from the chip of the integrated circuit card via the chip reader; and transmitting, via the computing network, an authorization response to a computing system associated with the token validation request in response to the validation, the authorization response authorizing the tokenized PAN for use in a payment transaction.

14. The non-transitory computer-readable medium of claim 13, wherein the tokenized PAN includes domain restrictions that only permit the tokenized PAN to be used with chip card reading transactions, and the validating comprises validating the tokenized PAN based on the domain restrictions that only permit the tokenized PAN to be used with chip card reading transactions.

15. The non-transitory computer-readable medium of claim 13, wherein the transaction entry mode value comprises a Point-of-Sale (POS) entry mode value representing that the tokenized PAN was read by a contact chip reader.

16. The non-transitory computer-readable medium of claim 13, wherein the method further comprises receiving a PIN of a user for verifying that the user is a cardholder of the integrated circuit card, and the validating comprises validating the tokenized PAN based on the PIN.

17. The non-transitory computer-readable medium of claim 13, further comprising receiving a second token validation request from a second integrated circuit card which comprises second tokenized PAN and a second transaction entry mode value identifying a domain in which the second tokenized PAN was entered.

18. The non-transitory computer-readable medium of claim 17, further comprising determining to decline the second token validation request when the second transaction entry mode value identifies that the domain in which the second tokenized PAN was entered is any of a magnetic stripe mode, an e-commerce mode, and card not present mode.

* * * * *